United States Patent
Shin et al.

(10) Patent No.: US 12,390,063 B2
(45) Date of Patent: Aug. 19, 2025

(54) FLOW STRUCTURE OF COMPANION ANIMAL DUST COLLECTOR

(71) Applicant: PEPE INC., Hanam-si (KR)

(72) Inventors: Geon Ho Shin, Hanam-si (KR); Wan Il So, Paju-si (KR)

(73) Assignee: PEPE INC., Hanam-si (KR)

( * ) Notice: Subject to any disclaimer, the term of this patent is extended or adjusted under 35 U.S.C. 154(b) by 360 days.

(21) Appl. No.: 18/104,219

(22) Filed: Jan. 31, 2023

(65) Prior Publication Data

US 2024/0225386 A1 Jul. 11, 2024

(30) Foreign Application Priority Data

Jan. 11, 2023 (KR) .................. 10-2023-0004199

(51) Int. Cl.
*A47L 9/00* (2006.01)
*A01K 13/00* (2006.01)
*A47L 9/12* (2006.01)
*A47L 9/22* (2006.01)

(52) U.S. Cl.
CPC ............ *A47L 9/0072* (2013.01); *A01K 13/00* (2013.01); *A47L 9/12* (2013.01); *A47L 9/22* (2013.01)

(58) Field of Classification Search
CPC . A47L 9/0072; A47L 9/12; A47L 9/22; A01K 13/00
See application file for complete search history.

(56) References Cited

U.S. PATENT DOCUMENTS

| 2003/0051452 A1* | 3/2003 | Oh .................. A47L 9/1683 55/424 |
| 2017/0202418 A1* | 7/2017 | Cheo ................ A47L 9/165 |
| 2019/0038097 A1* | 2/2019 | Cho ................. A47L 9/165 |
| 2023/0213220 A1* | 7/2023 | Wolf ................ F24F 8/98 261/29 |

FOREIGN PATENT DOCUMENTS

| CN | 115053826 A | * | 9/2022 | .......... A01K 13/001 |
| CN | 115720857 A | * | 3/2023 | |
| CN | 219000180 U | * | 5/2023 | |
| CN | 117617140 A | * | 3/2024 | |
| KR | 20030087274 A | * | 11/2003 | |

(Continued)

OTHER PUBLICATIONS

KR 20200120346 A—English Machine Translation (Year: 2020).*

*Primary Examiner* — Marc Carlson
(74) *Attorney, Agent, or Firm* — Revolution IP, PLLC

(57) ABSTRACT

The present invention relates to a flow structure of a companion animal duct collector, and more particularly, to a flow structure of a companion animal duct collector including a main body part that includes an inner case through which air or hair of a companion animal is introduced and an outer case surrounding front and rear surfaces of the inner case and discharging air moving through the inner case to the outside, a suction fan unit that has a motor fan inside the inner case, and a suction grill unit that includes a suction grill coupled to one side of the outer case and sucking in external air by the operation of the suction fan unit, whereby air is collected to the other side of the main body part to form a low pressure part, thereby forming an additional air flow by the operation of the suction fan unit.

8 Claims, 8 Drawing Sheets

(56) References Cited

FOREIGN PATENT DOCUMENTS

| KR | 20060025239 A | * | 3/2006 | |
|----|---------------|---|--------|---|
| KR | 20090084616 A | * | 8/2009 | |
| KR | 20110100481 A | * | 9/2011 | |
| KR | 20120038681 A | * | 4/2012 | |
| KR | 20120129181 A | * | 11/2012 | |
| KR | 20140019201 A | * | 2/2014 | |
| KR | 20160011465 A | * | 2/2016 | |
| KR | 20200120346 A | * | 10/2020 | |
| KR | 10-2234350 B1 | | 3/2021 | |
| KR | 20210058260 A | * | 5/2021 | |
| WO | WO-2019059465 A1 | * | 3/2019 | ............ A01K 13/00 |
| WO | WO-2021095963 A1 | * | 5/2021 | |

* cited by examiner

[Figure 1]
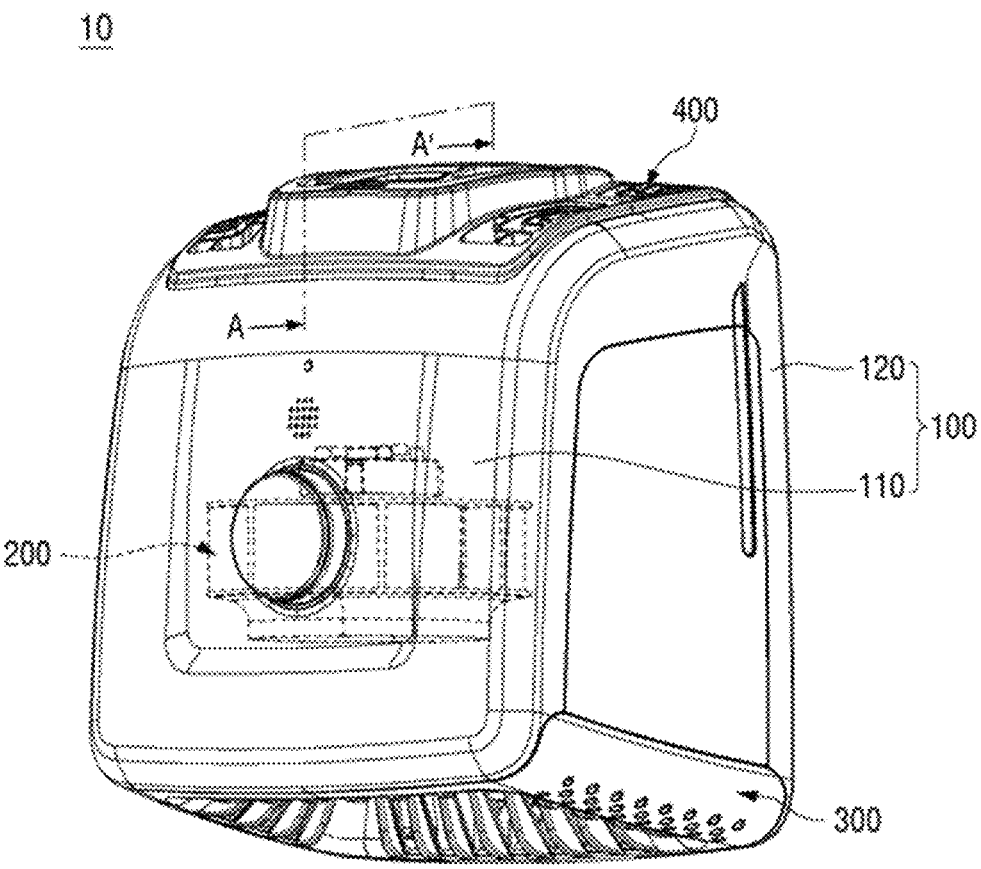

[Figure 2]
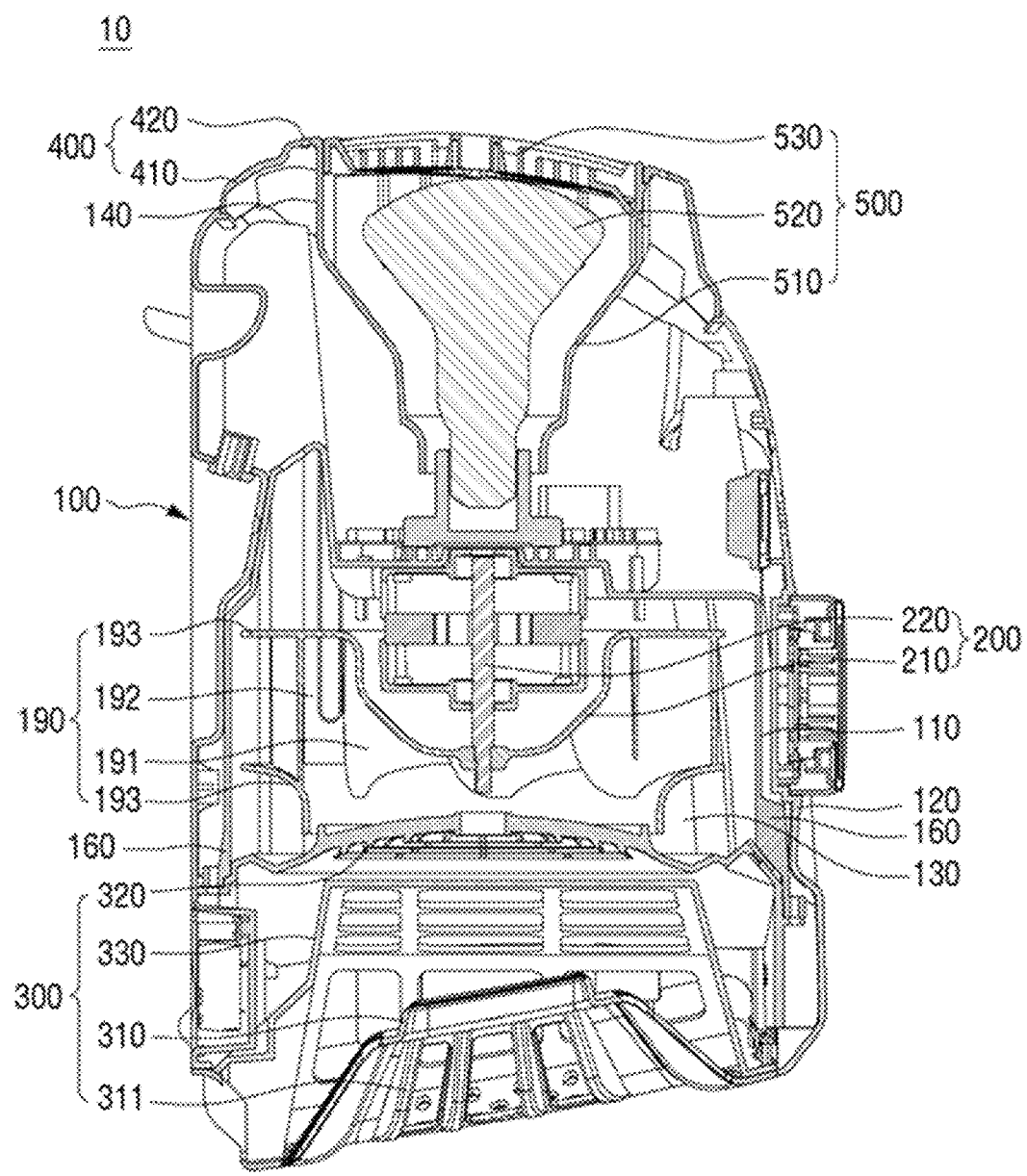

[Figure 3]
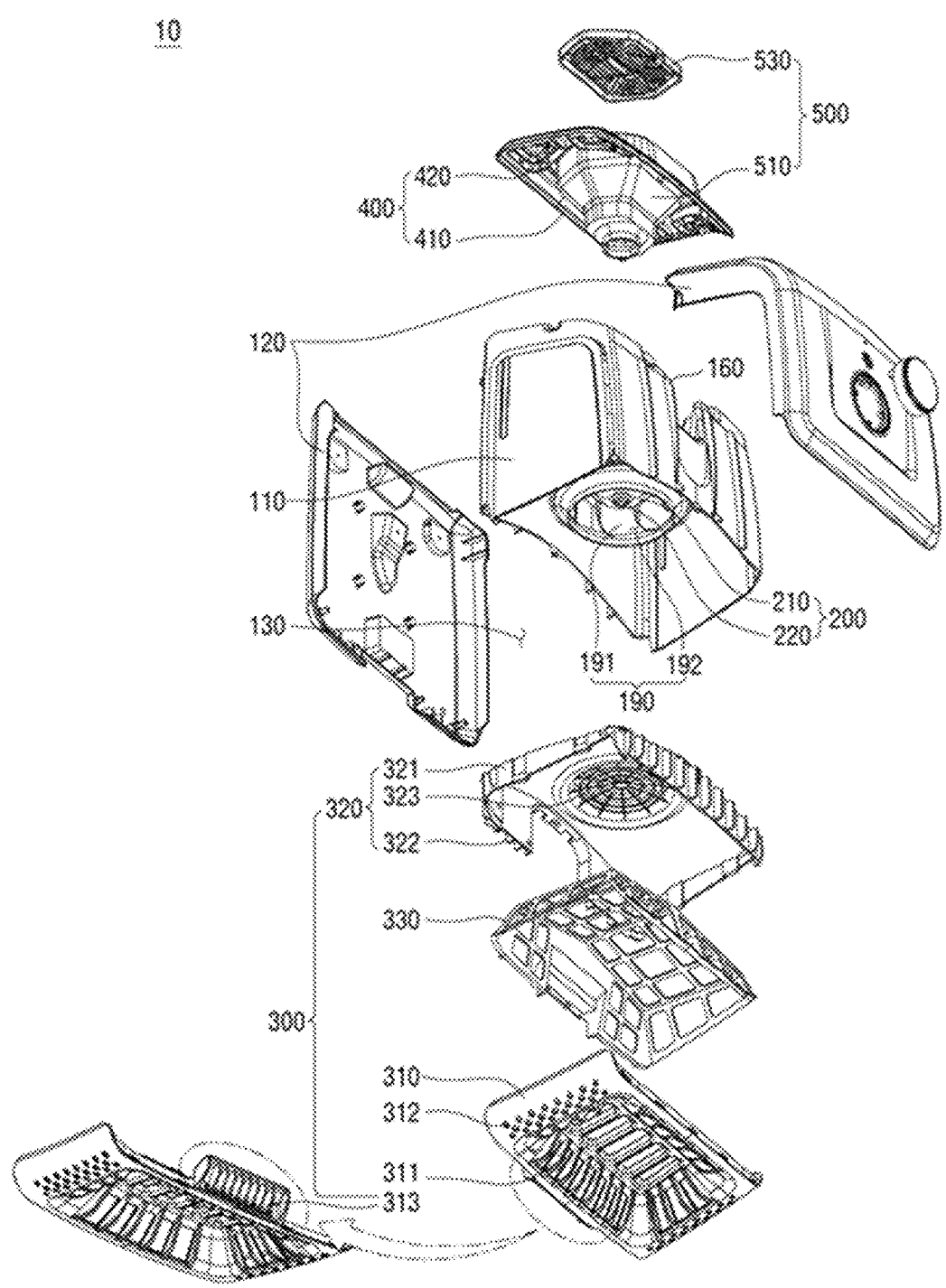

[Figure 4]
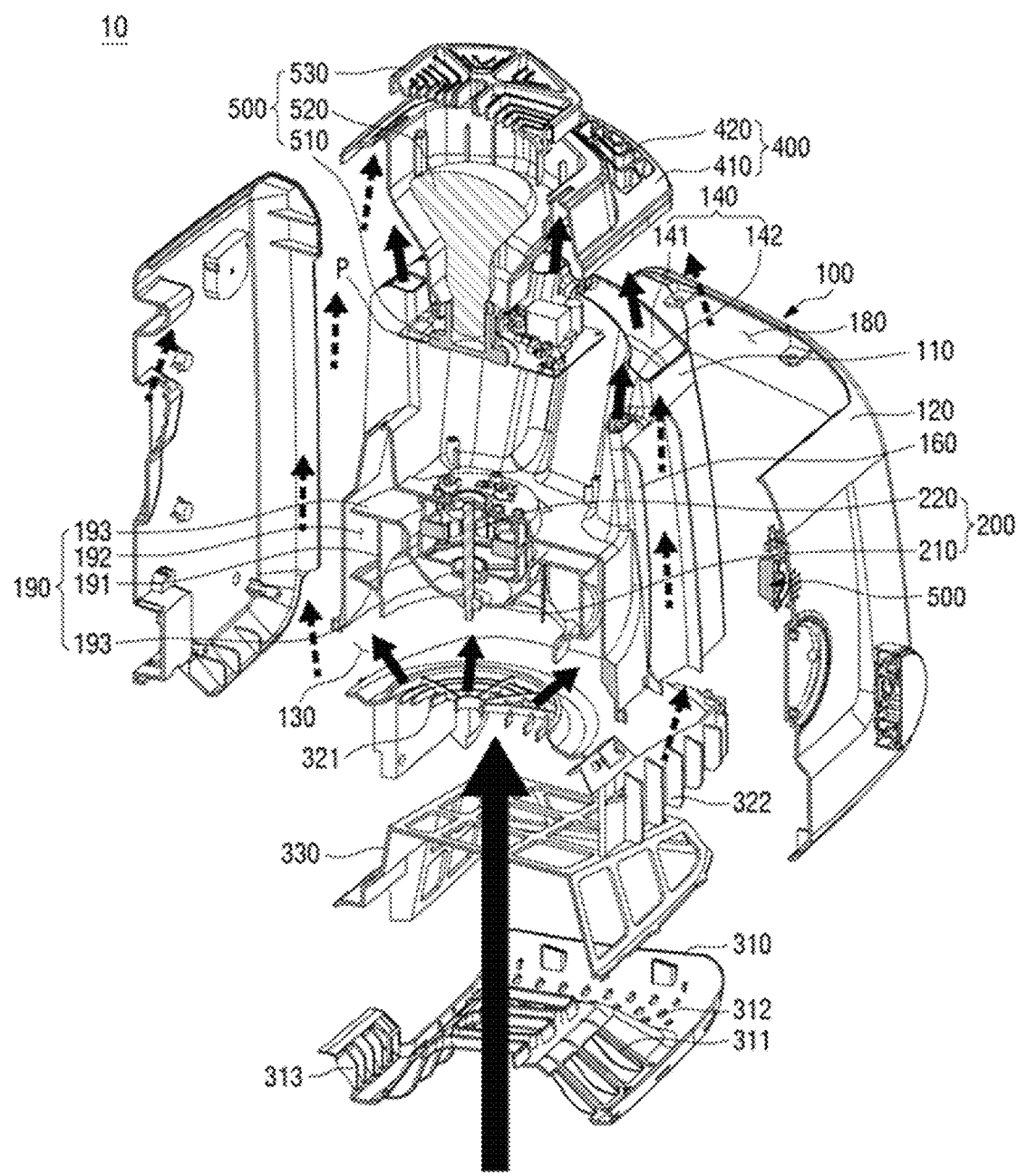

[Figure 5]
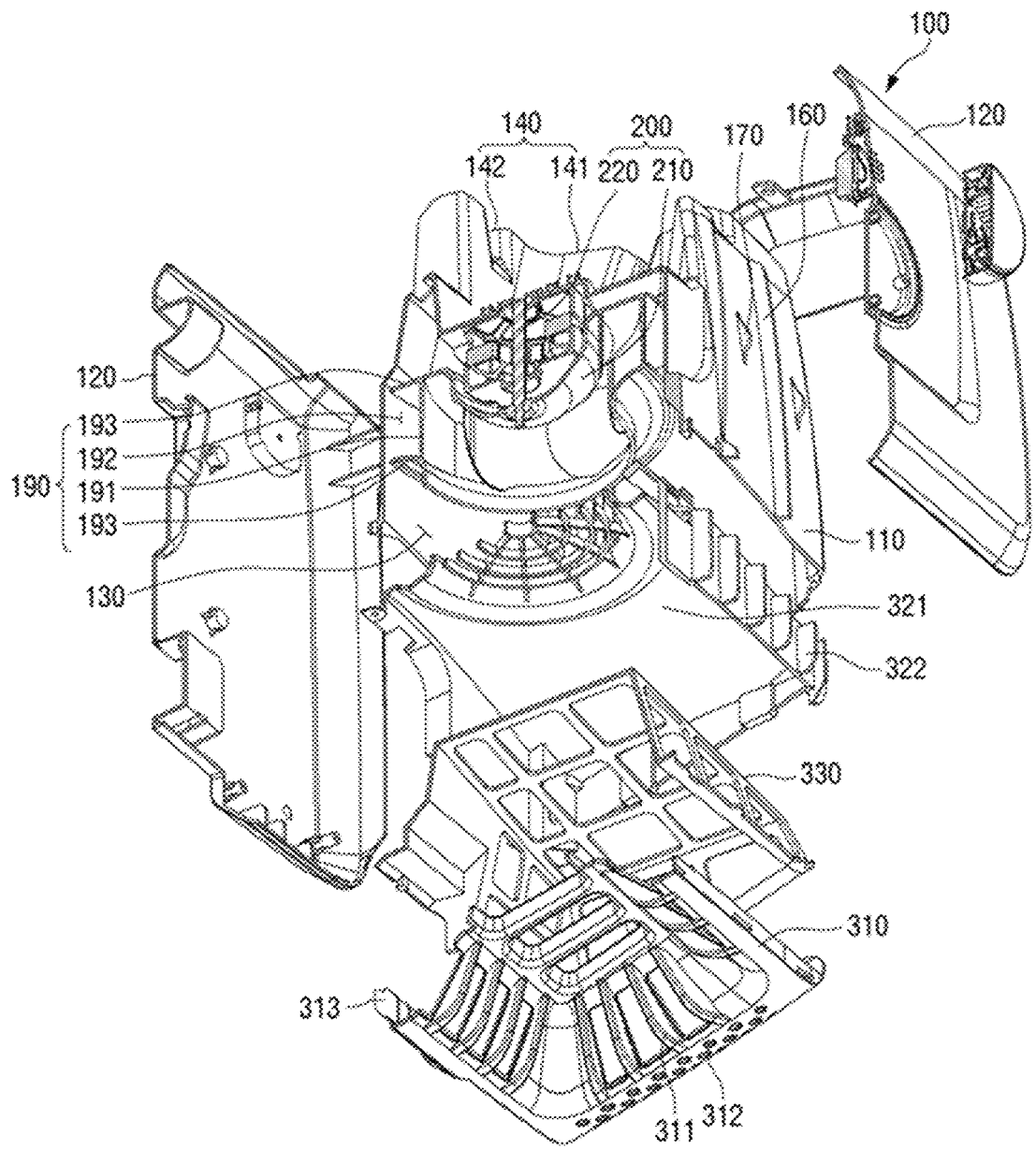

[Figure 6]
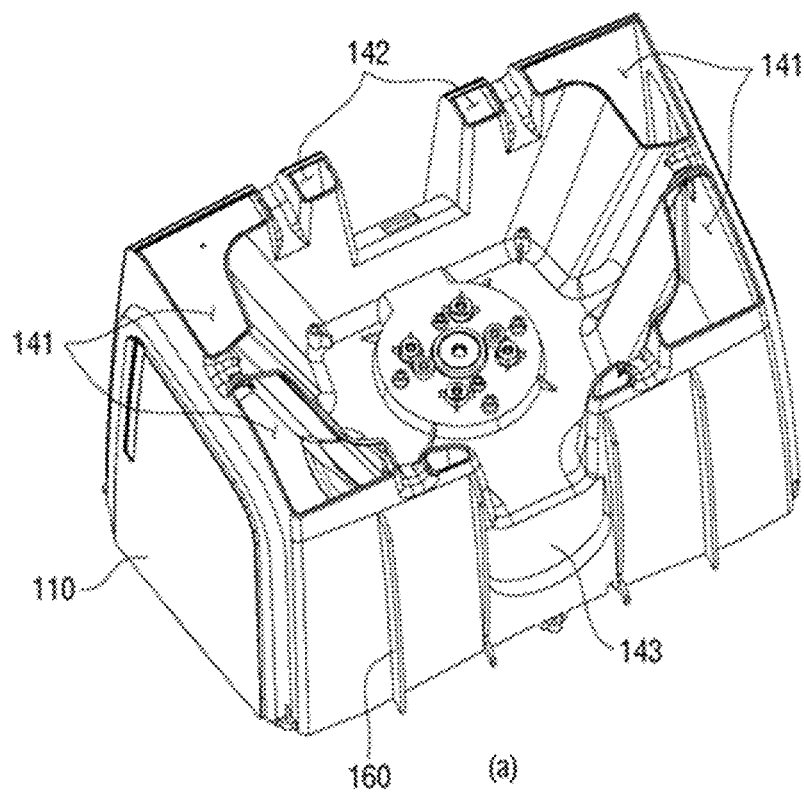
(a)
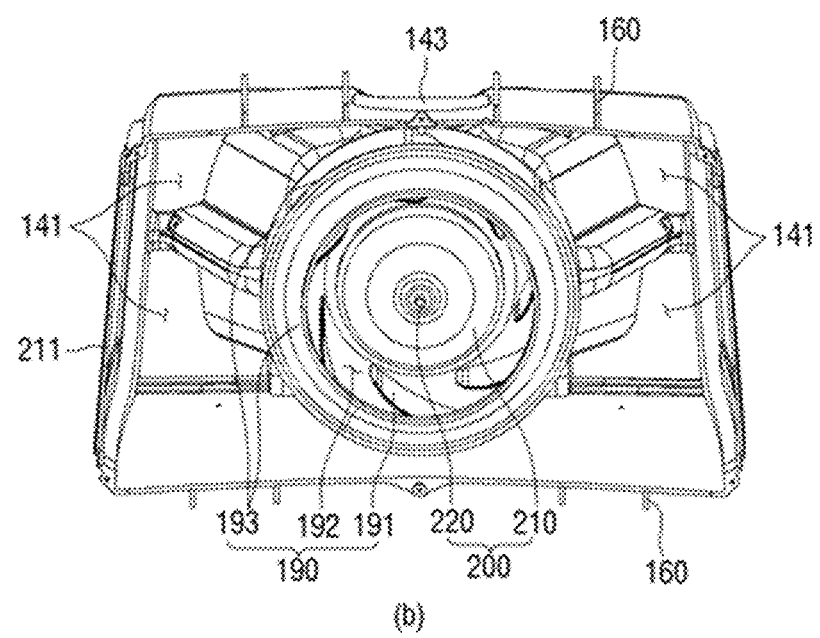
(b)

[Figure 7]
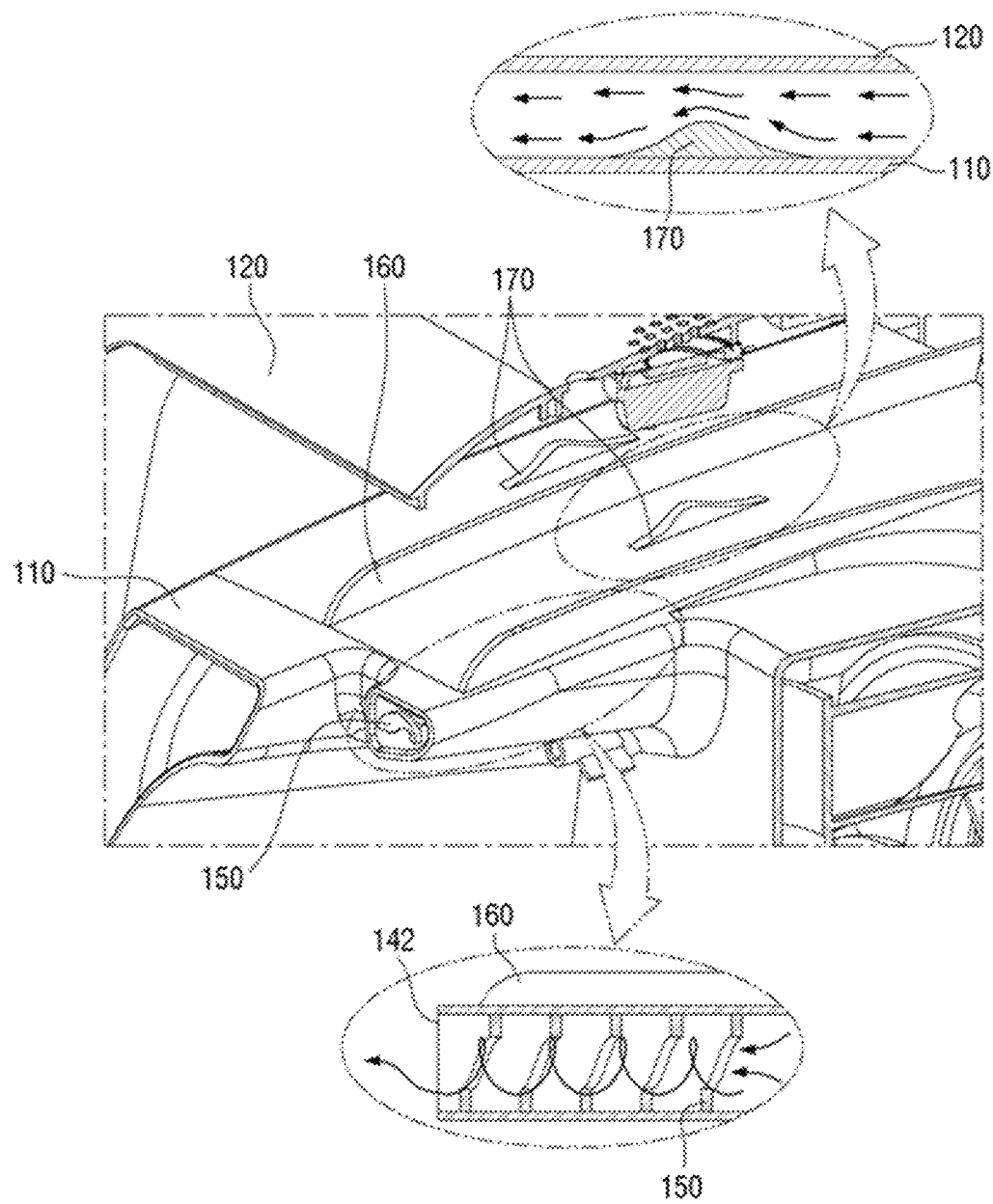

[Figure 8]
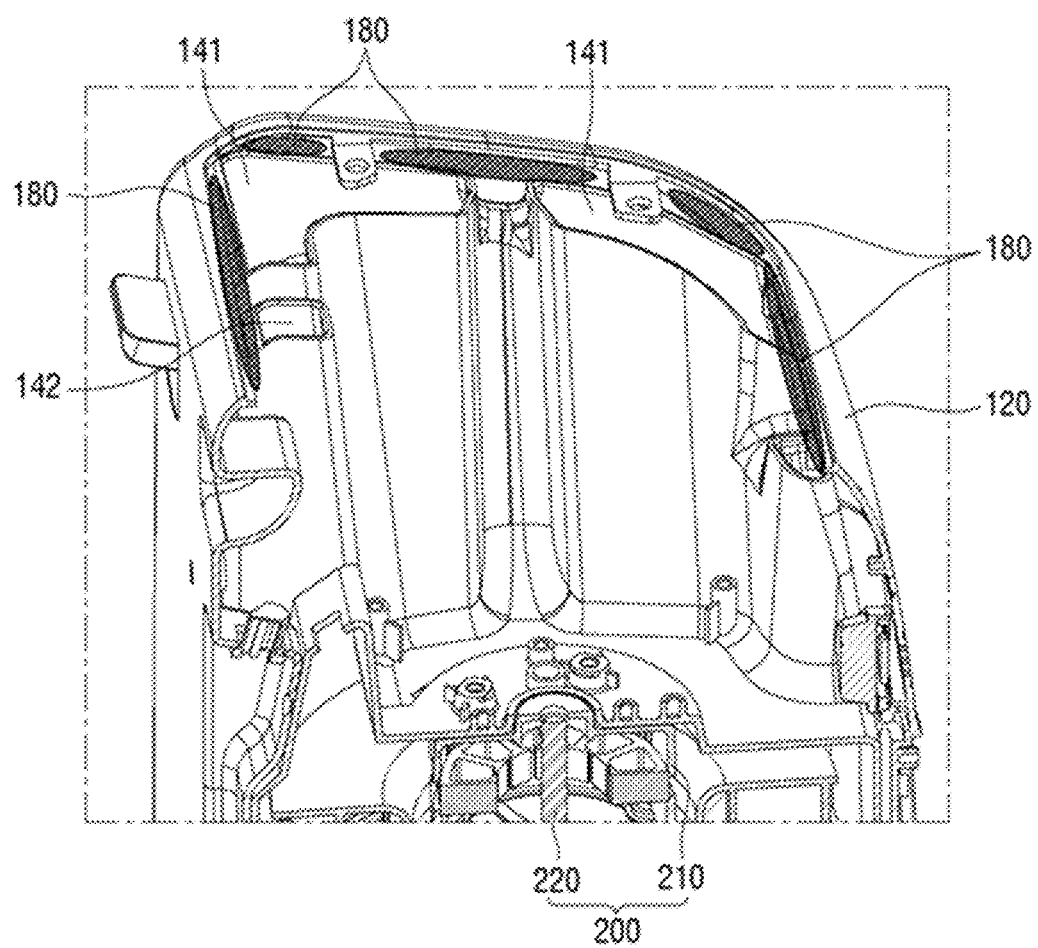

FLOW STRUCTURE OF COMPANION ANIMAL DUST COLLECTOR

TECHNICAL FIELD

The present invention relates to a flow structure of a companion animal dust collector, and more particularly, to a flow structure of a companion animal dust collector that operates a suction fan unit to suck hairs of companion animals scattered in the air into one side of a main body part and collect purified air to the other side of the main body part so as to lower air pressure and discharge the purified air.

BACKGROUND ART

Recently, the population raising companion animals such as dogs and cats is increasing as the rate of low birth rates and one- or two-person households increases.

As a result, various products such as bathtubs, playgrounds, exercise equipment, and beauty equipment used exclusively for companion animals are being developed and released, and product development for functional improvement is actively progressing.

Meanwhile, dogs or cats should be bathed frequently and groomed. This is because if bathing and hair care are not done properly, the hairs get together and cause skin diseases or odors, and the lost hairs scatter in the air, causing allergies or respiratory diseases.

For this reason, beauty equipment that may keep the surrounding environment clean by combing or brushing hairs of companion animals and at the same time sucking sheared or missing hairs has been developed.

However, the conventional beauty equipment does not have a function of drying hairs of companion animals, so there is a hassle of having to have a separate dryer.

Therefore, there is a need for a management device capable of shaving or brushing hairs of companion animals, sucking groomed hairs, and drying the hairs of the companion animals.

In addition, there is a need for a management device that strongly sucks and collects companion animal hairs scattered in the air, and discharges only air from which hairs are separated to dry companion animal hairs.

RELATED ART DOCUMENT

Patent Document (Patent Document 1) Korean Patent No. 10-2234350 (registered on Mar. 25, 2021)

DISCLOSURE

Technical Problem

The prevent invention proposes to solve the problems of the related art as described above, and provides a novel flow structure of a companion animal dust collector that operates a suction fan unit to suck companion animal's hair scattered in the air into one side of a main body part and collect purified air to the other side of the main body part so as to lower air pressure and discharge the purified air.

In addition, the present invention provides a flow structure of a companion animal dust collector capable of rotating air introduced into one side of an inner case with an air rotation unit to guide the air around a suction grill unit to an inside of the inner case, and increasing the amount of air moving the rotated air to the other side of the inner case through an air moving unit.

In addition, the present invention provides a flow structure of a companion animal dust collector that moves air introduced into a suction grill unit to front and rear sides of an inner case so that the air moves to an inside and outside of the inner case, respectively, and collects the air to the other side of an outer case to form a low pressure part further lowering an air pressure, further increase the amount of air, and discharge the air to the outside.

Technical Solution

To solve the above problem, the present invention provides a flow structure of a companion animal dust collector, including:
 a main body part that includes an inner case through which air or hair of a companion animal is introduced and an outer case surrounding front and rear surfaces of the inner case and discharging air moving through the inner case to the outside;
 a suction fan unit that has a motor fan inside the inner case; and
 a suction grill unit that includes a suction grill coupled to one side of the outer case and sucking in external air by the operation of the suction fan unit.

The main body part may further include: a space part that collects air introduced into the suction grill unit to one side of the suction fan unit; and an air moving unit that includes first air moving units communicating with the space part and extending facing each other around the other side of the suction fan unit and a second air moving unit communicating with the space part on at least one side of the first air moving unit and extending to the other side of the suction fan unit.

The air moving unit may further include a cyclone unit for rotating the moving air by forming a spiral protrusion on an inside of the second air moving unit.

The air moving unit may lower a pressure of air discharged to the other side by forming a small area from one side toward the other side.

The main body part may further include a plurality of moving guide parts that are arranged on at least one of the front and rear sides of the inner case to move the air introduced from the suction grill unit to the other side of the outer case.

The main body part may form streamlined protrusions between the moving guide parts, respectively, to lower the pressure of air passing through the moving guide part.

The main body part may further include a low pressure part that forms a lower air pressure on the other side of the outer case due to low pressure air discharged from the air moving unit and the air moving through the moving guide part.

The main body part may further include an air rotating unit which radially arranges curved partition walls around the suction fan unit to form discharge holes and rotates the air introduced from the space part.

The suction grill unit may further include an Air moving part that moves to at least one surface of the front and rear surfaces of the inner case by forming a body having a communication hole accommodated in the space part and communicating with the suction fan unit and forming a plurality of wall protrusions arranged on a bent surface of the body.

The suction grill unit may further include a dust collecting filter unit that is disposed between the suction grill and the Air moving part to collect the hairs of the companion animal flowing into the suction grill when the companion animal is located on one side of the inner case.

Advantageous Effects

According to the present invention, a flow structure of a companion animal dust collector operates a suction fan unit to suck companion animal's hair scattered in the air into one side of a main body part and collect purified air to the other side of the main body part so as to lower air pressure and discharge the purified air, thereby increasing the discharged amount of air by creating an additional air flow to the moving air by the operation of the suction fan unit.

In addition, it is possible to rotate air introduced into one side of an inner case with an air rotation unit to guide the air around a suction grill unit to an inside of the inner case, and increase the amount of air moving the rotated air to the other side of the inner case through an air moving unit.

In addition, air introduced into a suction grill unit moves to the inside and outside of the inner case, respectively, and is collected to the other side of the outer case, thereby forming a low pressure part that further lowers an air pressure and further increases the amount of air.

In addition, by forming a heat discharge pipe that communicates with the other side of the inner case in the suction fan unit to discharge heat generated by an operation of an electric motor, it is possible to increase a suction force for sucking air into the suction grill unit due to a difference in temperature between the air flowing into one side of the inner case and hot air.

DESCRIPTION OF DRAWINGS

FIG. 1 is a perspective view illustrating an appearance of a flow structure of a companion animal dust collector according to an embodiment of the present invention.

FIG. 2 is a cross-sectional view taken along line A-A' in FIG. 1.

FIG. 3 is an exploded perspective view of the flow structure of a companion animal dust collector according to the embodiment of the present invention.

FIG. 4 is an exploded cross-sectional perspective view of FIG. 3.

FIG. 5 is a bottom exploded cross-sectional perspective view illustrating FIG. 4 as a bottom view.

FIG. 6 is an exemplary view illustrating an air moving pipe and an air rotating unit of the flow structure of a companion animal dust collector according to the embodiment of the present invention.

FIG. 7 is an exemplary view illustrating a cyclone part and a streamlined protrusion of the flow structure of a companion animal dust collector according to the embodiment of the present invention.

FIG. 8 is an exemplary view illustrating a low pressure part of the flow structure of a companion animal dust collector according to the embodiment of the present invention.

BEST MODE

Hereinafter, embodiments will be described in detail with reference to the accompanying drawings so that they can be easily practiced by those skilled in the art to which the present invention pertains. However, in describing an operating principle of exemplary embodiments of the present invention, detailed descriptions of well-known functions or constructions will be omitted so as not to obscure the description of the present invention with unnecessary detail.

In addition, like or similar reference numerals denote parts performing similar functions and actions throughout the drawings.

A case in which any one part is connected with the other part includes a case in which the parts are directly connected with each other and a case in which the parts are indirectly connected with each other with other elements interposed therebetween. In addition, a phrase 'including any component' will be understood to imply the inclusion of other components rather than the exclusion of other component, unless explicitly described otherwise.

Hereinafter, a flow structure of a companion animal dust collector according to a preferred embodiment of the present invention will be described in detail with reference to the accompanying drawings.

As illustrated in FIG. 1, a flow structure 10 of a companion animal dust collector according to an embodiment of the present invention includes a main body part 100, a suction fan unit 200, and a suction grill unit 300.

More specifically, as illustrated in FIGS. 1 and 2, the flow structure 10 of a companion animal dust collector according to an embodiment of the present invention includes a main body part 100 that includes an inner case 110 through which air or hair of a companion animal is introduced and an outer case 120 surrounding front and rear surfaces of the inner case and discharging air moving through the inner case to the outside, a suction fan unit 200 that has a motor fan inside the inner case, and a suction grill unit 300 that includes a suction grill 310 coupled to one side of the outer case and sucking in external air by the operation of the suction fan unit.

Referring to FIGS. 1 and 2, the main body part 100 is a device for collecting hairs by sucking air and hairs of companion animals scattered in the air to one side, and discharging purified air to the other side.

That is, the main body part 100 is located on one side of the companion animal, so that hair scattered into the air during combing may be sucked. It is a device that dries the hairs of the companion animal with the purified air by placing the bathed companion animal on the other side.

To this end, the main body part 100 further includes an inner case 110, an outer case 120, a space part 130, and an air moving unit 140.

Referring to FIGS. 3 and 4, the inner case 110 introduces air and hair of a companion animal to one side based on the suction fan unit 200 to be described later, and forms the air moving unit 140 extending to the other side as an outer wall.

The outer case 120 is spaced apart from the front and rear surfaces of the inner case 110 by a predetermined distance and coupled to surround them.

To this end, the outer case 120 is formed of a first plate located on the front side of the inner case 110, in which one side of the first plate is bent to be coupled to the other side of the inner case 110. In addition, the bent portion is opened so that a cover part 400 and a lighting unit 500 to be described later may be coupled.

In addition, the outer case 120 forms a second plate that is spaced apart from the rear surface of the inner case 110 by a predetermined distance and coupled thereto.

The outer case 120 provides a closed space when moving the air introduced through the suction grill unit 300 to the other side of the inner case 110 along the front and rear surfaces of the inner case 110, thereby forming a flow path that may be discharged to the discharge grill unit 420 formed in the cover part 400.

Referring to FIGS. 4 and 5, the space part 130 forms a space on one side of the suction fan unit 200 to collect air introduced into the suction grill unit 300.

That is, the space part 130 is formed as a space for collecting air inside the inner case 110 extending in one direction with respect to the suction fan unit 200 and serves to move the air introduced through the suction grill unit 300 to an air rotating unit 190 and the air moving unit 140 to be described later.

Referring to FIGS. 4 and 6, the air moving unit 140 includes first air moving units 141 communicating with the space part 130 and extending facing each other around the other side of the suction fan unit 200 and a second air moving unit 142 communicating with the space part 130 on at least one side of the first air moving unit 141 and extending to the other side of the suction fan unit 200.

In addition, it is preferable that the air moving unit 140 lowers a pressure of air discharged to the other side by forming a small area from one side toward the other side.

A space is formed inside the first air moving unit 141 to form an outer surface of the inner case 110 in the longitudinal direction. To this end, the air located in the space part 130 is introduced into and moves to the other side of the inner case 110 by extending facing each other around the other side of the suction fan unit 200.

In this case, the first moving unit 141 serves as a passage through which it can move at a higher speed by the rotational force of the air rotating by the air rotating unit 190.

The second air moving unit 142 communicates with the space part 130 on at least one side of the first air moving unit 141 and extends to the other side of the suction fan unit 200, and as illustrated in the drawings herein, is preferably formed on both sides of the first air moving unit 141.

In particular, as illustrated in FIG. 6, the air moving unit 140 may further include an air discharge hole 143.

The air discharge hole 143 forms a hole in the space part 140 to prevent a vortex phenomenon because the amount of air collected in the space part 130 is greater than a rate at which air is discharged, and moves some of the air to the front and rear surfaces of the inner case 110.

Meanwhile, as illustrated in FIG. 7, in the flow structure 10 of a companion animal dust collector according to an embodiment of the present invention, the main body part 100 may further include a cyclone unit 150.

The cyclone unit 150 serves to rotate the moving air by forming a spiral protrusion on the inside of the second air moving unit 142.

That is, the cyclone unit 150 forms a spiral protrusion inside the second air moving unit 142 having a diameter smaller than that of the first air moving unit 141, and rotates the air introduced from the space part 130 when moving to the other side of the inner case 110.

Due to this, the flow of air is accelerated to increase the volume of air collected on the other side of the inner case 110 and lower the pressure, so that the speed at which the air collected in the space part 130 moves to the other side of the inner case 110 is increased.

In addition, as illustrated in FIGS. 4 to 7, in the flow structure 10 of a companion animal dust collector according to the embodiment of the present invention, the main body part 100 further includes a moving guide part 160, a streamlined protrusion 170, a low pressure part 180, and an air rotating unit 190.

Referring to FIGS. 4 and 6, the plurality of moving guide parts 160 are partition walls that are arranged on at least one of the front and rear sides of the outside of the inner case 110 to move air introduced from the suction grill unit 300 to the other side of the outer case 120.

That is, when some of the air introduced into the suction grill unit 300 moves to the space part 130 and the remaining air flows in between the inner case 110 and the outer case 120, the moving guide part 160 serves to partition and guide the air to move to the other side of the inner case 110.

For example, when there is no configuration of the moving guide part 160, when air flows in between the inner case 110 and the outer case 120, the air is mixed between the inner case 110 and the outer case 120 by the pushing force of the air introduced from the suction grill unit 300, thereby preventing the air from moving in one direction.

Therefore, it is preferable to form the moving guide part 160 to smoothly move the flow of air in one direction.

Referring to FIG. 7, the streamlined protrusion 170 is formed as a protrusion that lowers the pressure of air passing through the moving guide part 160 by forming a streamlined protrusion between each moving guide part 160.

That is, after the air moving to the outer surface of the inner case 110 along the moving guide part 160 is collected in the streamlined protrusion 170 to lower the pressure, by increasing the pressure of the part passing through the streamlined protrusion 170, the movement speed is further increased due to the difference in air pressure.

As a result, when air is introduced into the moving guide part 160, next air replaces separate power to move the air.

Referring to FIGS. 4 and 8, the low pressure part 180 is a space that forms a lower air pressure on the other side of the outer case 120 due to the low-pressure air discharged from the air moving unit 140 and the air moving through the moving guide part 160.

The low pressure part 180 increases the volume of air to move a large amount of air to the discharge grill unit 420 formed on the cover part 400, thereby inducing the air to a long distance from the main body part 100.

Referring to FIGS. 5 and 6, the air rotating unit 190 serves to radially arrange the curved partition walls 191 around the suction fan unit 200 to form a discharge hole 192, and rotate the air introduced from the space part 130.

In the curved partition wall 191, curved plates are arranged radially at a center of a circle to rotate air in one direction inside an inlet 193 including an upper flange and a lower flange extending from a rim of a motor accommodating part 210 forming the suction fan unit 200.

In this case, the lower flange is formed to communicate with a communication hole 323 formed in an Air moving part 320.

Therefore, air flows into the lower flange through the communication hole 323 and rotates along the curved partition wall 191.

The discharge hole 192 discharges air moving through the curved partition wall 191 to the outside and moves the air to the air moving unit 140 formed on the other side of the suction fan unit 200.

In addition, the discharge hole 192 maintains the rotational force of air by the air introduced into the inlet 193 and maintains the flow of air moving to the air moving unit 140.

As illustrated in FIGS. 3 and 4, in the flow structure 10 of a companion animal dust collector according to the embodiment of the present invention, the suction fan unit 200 includes the motor fan formed inside the inner case 110, and serves to introduce ambient air into the inner case 110.

To this end, the suction fan unit 200 further includes a motor accommodating part 210, a motor fan shaft 220, and a heat discharge pipe 230.

The motor accommodating part 210 is formed by accommodating an electric motor in a center of a partition plate that is disposed inside the inner case 110 and partitions one side and the other side.

In addition, the motor accommodating part 210 allows a board P having an electronic circuit to be seated and coupled to operate a lighting unit 400 and an electric motor to be described later.

The motor fan shaft 220 rotates by an electric motor and combines rotary blades at one end. Here, the rotary blade has a general shape and is omitted from the drawing in order to clearly identify the coupling relationship of the configuration of the present invention.

The heat discharge pipe 230 is a pipe that extends from the motor accommodating part 210 to the other side of the inner case 110 and discharges heat generated by the operation of the electric motor to the outside.

In particular, the heat discharge pipe 230 may further increase the movement speed of the air introduced into one side of the inner case 110 due to a temperature difference from the air introduced into the space part 130.

As illustrated in FIGS. 3 and 4, in the flow structure 10 of a companion animal dust collector according to the embodiment of the present invention, the suction grill unit 300 is formed as a suction grill 310 coupled to one side of the outer case 120 and sucking in external air by the operation of the suction fan unit 200.

The suction grill 310 is formed as a frame having one side convex, and the convex one side forms an inclined surface to form a grill-shaped hole through which air is introduced into the one surface and the inclined surface, respectively.

This suction grill 310 further includes a guide part 311 and an inflow hole 312.

The guide part 311 forms a protrusion on the inclined surface forming the suction grill 310 to guide external air to be collected in the center of one side of the outer case 120.

The inflow hole 312 is formed as a plurality of through holes on both sides of the suction grill 310 to allow the air collected in the suction grill 310 to inflow and move more air to the space part 130.

In addition, as illustrated in FIGS. 4 and 5, the suction grill unit 300 further includes the Air moving part 320 and a dust collecting filter unit 330.

The Air moving part 320 is formed of a case-shaped body 321 with one side open to accommodate the suction grill 310, and a plurality of wall protrusions 322 are formed on at least one of the outer surfaces of the body 321.

The wall protrusion 322 prevents air from being dispersed when some of the air introduced into the suction grill 310 is discharged and moves to the outside of the body 321, and moves the air in one direction.

Due to this, air is partitioned by the wall protrusion 322 and flows in between the inner case 110 and the outer case 120.

In this case, the air moving along the wall protrusion 322 is mixed with the air discharged through the above-described air discharge hole 143 and moves to the other side of the inner case 110.

Referring to FIGS. 4 and 5, the dust collecting filter unit 330 is a filter that is disposed between the suction grill 310 and the Air moving part 320 to collect the hair of the companion animal introduced into the suction grill 310 when the companion animal is located on one side of the inner case 110.

For example, when the companion animal is located on one side of the main body part 100 and combed, the hair of the companion animal may scatter.

In this case, when the air and the hair of the companion animal scattered in the air flow into the suction grill 310 by the operation of the suction fan unit 200, the dust collecting filter unit 330 collects the hair of the companion animal and allows the air to pass through.

The dust collecting filter unit 330 is formed of a frame having one side coupled to the suction grill 310 and the other side converging to the center toward the Air moving part 320, and at least one frame is formed inside the frame to form a through hole therein. A mesh net is attached to the frame.

Meanwhile, as illustrated in FIGS. 1 and 4, the flow structure 10 of a companion animal dust collector according to the embodiment of the present invention may include a cover part 400 and a lighting unit 500.

The cover part 400 is provided with a cover body 410 opening and closing the other side of the main body part 100 and at least one discharge grill unit 420 on both sides of one surface of the cover body 410, respectively.

The discharge grill unit 420 serves to discharge the air collected by the low pressure part 180 to the outside to dry the hair of the companion animal located on the other side of the main body part 100 or guide purified air to every corner of a house.

Referring to FIGS. 4 and 5, the lighting unit 500 may dispose an infrared lamp 520, which is accommodated in the other side of the main body part 100 and emits light, in an accommodating part 510.

The accommodating part 510 may form a space extending inwardly of the inner case 110 at the center of the cover body 410 and operate by connecting the infrared lamp 520 to the substrate P.

In addition, the lighting unit 500 may transmit light emitted from the infrared lamp 520 to the outside by forming a transmission unit 430 that is detachable to open and close the center of the cover body 410.

As a result, the effect of preventing skin diseases, arthritis, and otitis media of companion animals may be expected.

As described above, in the detailed description of the present invention, the preferred embodiments of the present invention have been described, but this exemplarily describes the best embodiment of the present invention and does not limit the present invention. In addition, those skilled in the art to which the present invention pertains may make various modifications and imitations within the scope of the technical spirit of the present invention.

Therefore, the scope of the present invention is not limited to the above-described embodiments, but may be implemented in various forms of embodiments within the scope of the appended claims. All ranges that can be modified without departing from the gist of the present invention claimed in the claims by those skilled in the art to which the invention pertains are considered to be within the scope of the claims of the present invention.

DESCRIPTION OF REFERENCE SIGNS

10: Flow structure of a companion animal dust collector
100: Main body part
110: Inner case
120: Outer case
130: Space part
140: Air moving unit
141: First air moving unit 142: Second air moving unit
143: Air discharge hole
150: Cyclone unit
160: Moving guide part
170: Streamlined protrusion
180: Low pressure part
190: Air rotating unit
191: Curved partition wall
192: Discharge hole
193: Inlet
200: Suction fan unit
210: Motor accommodating part
220: Motor fan shaft
300: Suction grill unit
310: Suction grill
311: Guide part
312: Inflow hole
320: Air moving part
321: Body
322: Wall protrusion
323: Communicating hole
330: Dust collecting filter unit
400: Cover part
410: Cover body
420: Discharge grill unit
500: Lighting unit
510: Accommodating part
520: Infrared lamp
530: Transmission unit

The invention claimed is:

1. A flow structure of a companion animal dust collector, comprising:
    a main body part that includes an inner case through which air or hair of a companion animal is introduced and an outer case surrounding front and rear surfaces of the inner case and discharging air moving through the inner case to the outside;
    a suction fan unit that has a motor fan inside the inner case; and
    a suction grill unit that includes a suction grill coupled to one side of the outer case and sucking in external air by the operation of the suction fan unit,
    wherein the main body part further includes:
    a space part that collects air introduced into the suction grill unit to one side of the suction fan unit; and
    an air moving unit that includes first air moving units communicating with the space part and extending facing each other around the other side of the suction fan unit and a second air moving unit communicating with the space part on at least one side of the first air moving unit and extending to the other side of the suction fan unit, and
    wherein the main body part further includes an air rotating unit which radially arranges curved partition walls around the suction fan unit to form discharge holes and rotates the air introduced from the space part.

2. The flow structure of a companion animal dust collector of claim 1, wherein the air moving unit further includes a cyclone unit for rotating the moving air by forming a spiral protrusion on an inside of the second air moving unit.

3. The flow structure of a companion animal dust collector of claim 1, wherein the air moving unit lowers a pressure of air discharged to the other side by forming a small area from one side toward the other side.

4. The flow structure of a companion animal dust collector of claim 1, wherein the main body part further includes a plurality of moving guide parts that are arranged on at least one of the front and rear sides of the outside of the inner case to move the air introduced from the suction grill unit to the other side of the outer case.

5. The low structure of a companion animal dust collector of claim 4, wherein the main body part forms streamlined protrusions between the moving guide parts, respectively, to lower the pressure of air passing through the moving guide part.

6. The flow structure of a companion animal dust collector of claim 4, wherein the main body part further includes a low pressure part that forms a lower air pressure on the other side of the outer case due to low pressure air discharged from the air moving unit and the air moving through the moving guide part.

7. The flow structure of a companion animal dust collector of claim 1, wherein the suction grill unit further includes an air moving part that moves air to at least one surface of the front and rear surfaces of the inner case by forming a body having a communication hole accommodated in the space part and communicating with the suction fan unit and forming a plurality of wall protrusions arranged on a bent surface of the body.

8. The flow structure of a companion animal dust collector of claim 7, wherein the suction grill unit further includes a dust collecting filter unit that is disposed between the suction grill and the air moving part to collect the hairs of the companion animal flowing into the suction grill when the companion animal is located on one side of the inner case.

* * * * *